Patented Nov. 14, 1933

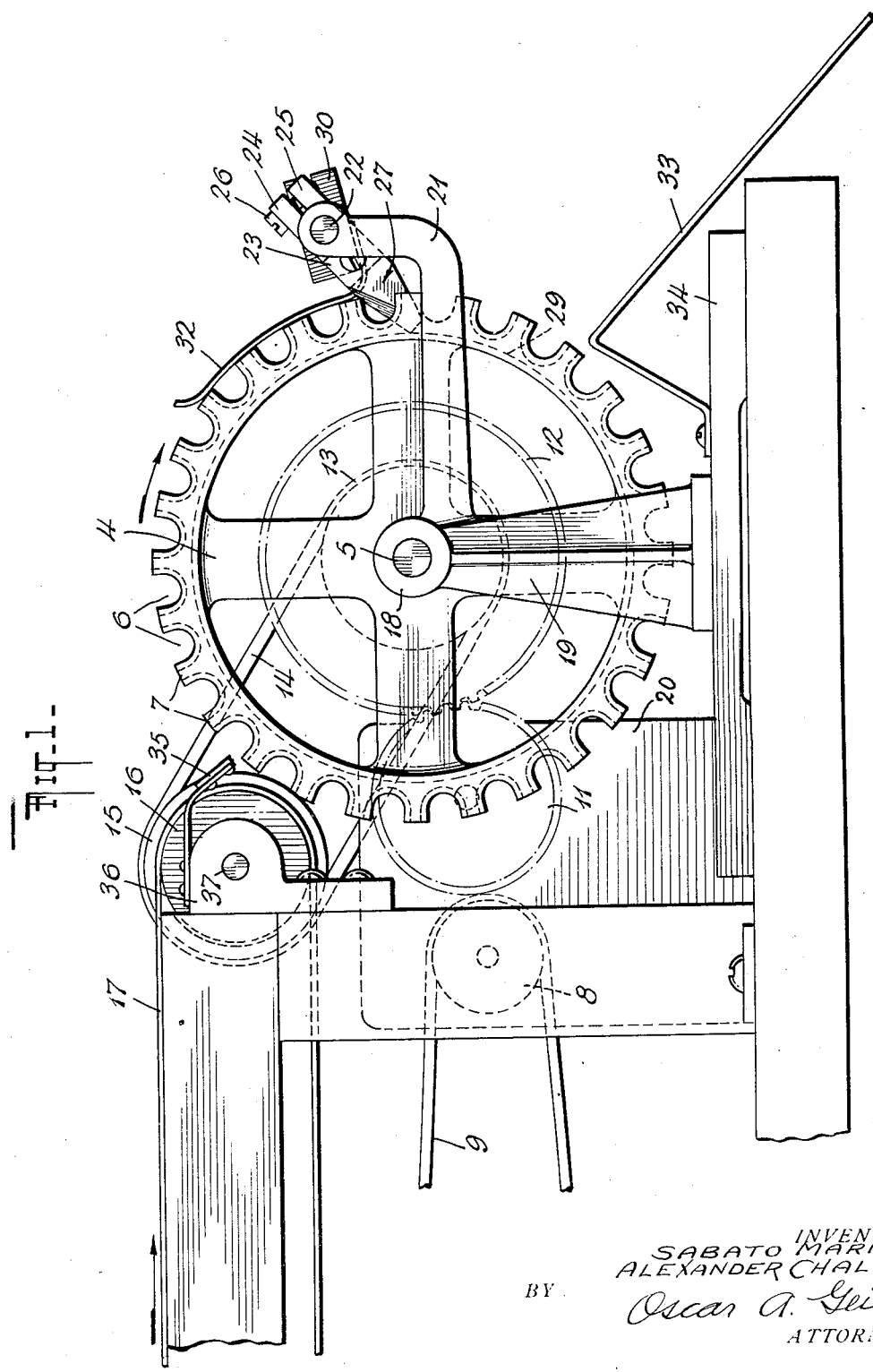

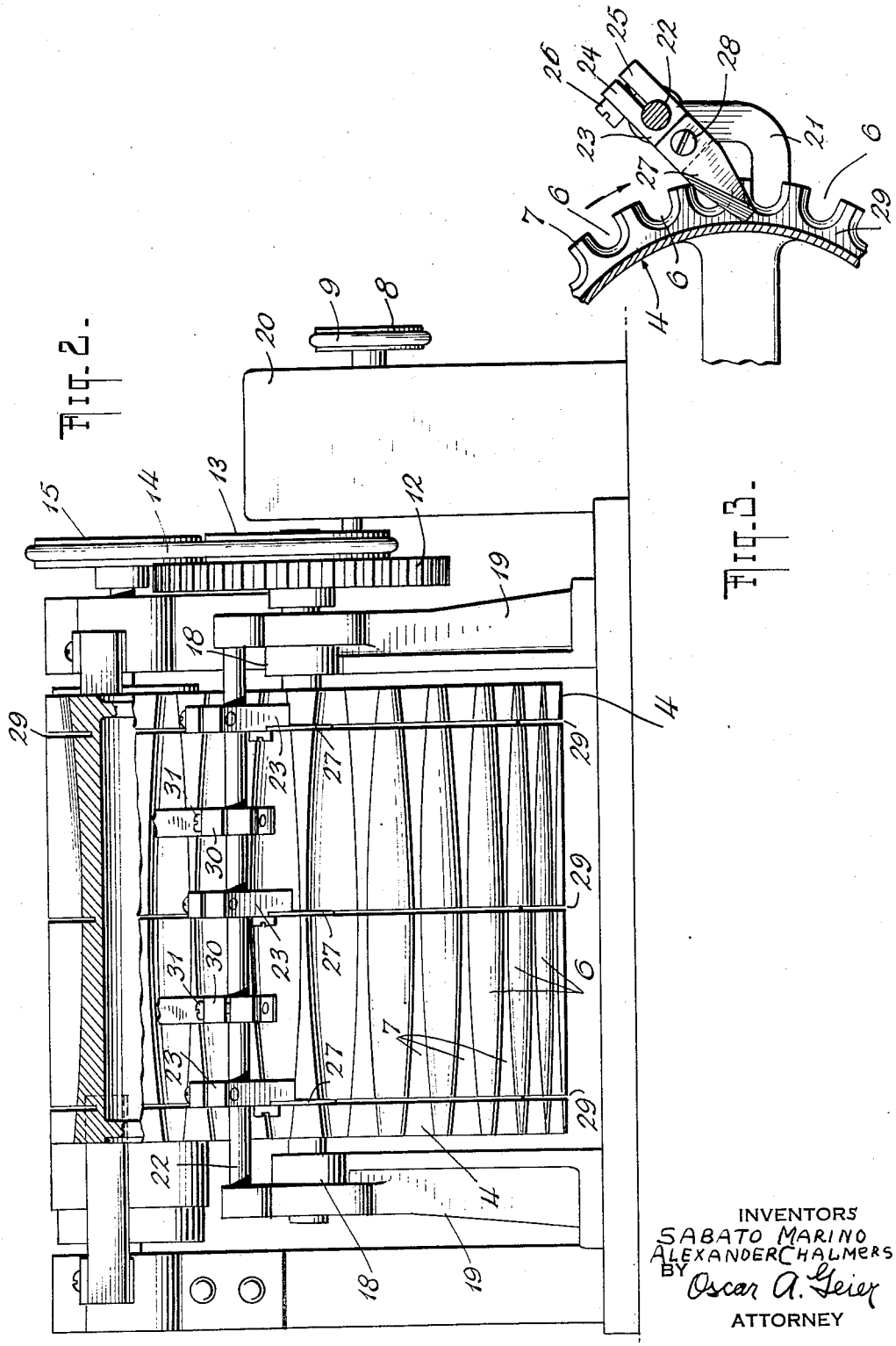

1,935,408

UNITED STATES PATENT OFFICE 1,935,408

CIGAR CUTTING DEVICE

Sabato Marino and Alexander Chalmers, Brooklyn, N. Y.

Application August 11, 1932. Serial No. 628,336

3 Claims. (Cl. 131—37)

This invention relates to a cutting and trimming device and refers more particularly to a device for cutting and trimming cigars or similarly shaped articles.

An object of this invention is to provide a simple, inexpensive and effective cigar-cutting device for accomplishing the work which was hitherto performed by manual labor.

Another object is to provide means for cutting and trimming cigars of a popular type which are composed of large tobacco leaves and when first manufactured are usually twice as long as when they reach the consumer.

A further object is to provide a cigar-cutting device which comprises a movable cigar carrier provided with a number of grooves used for carrying the cigars and a number of other grooves, intersecting those first-named, which are used as guides for the cigar cutting blades.

The above and other objects will appear more clearly from the following detailed description when taken in connection with the accompanying drawings which illustrate a preferred embodiment of the inventive idea.

In the drawings:—

Figure 1 shows a cigar-cutting machine embodying the principles of this invention in side elevation.

Figure 2 is a front view of the same machine, with some parts broken off.

Figure 3 shows the cigar-cutting means.

The machine illustrated in the drawings comprises a drum 4 mounted on a shaft 5 and firmly connected therewith. The external curved surface of the drum 4 is provided with a number of grooves 6 which extend along the entire length of the drum and are placed parallel to the drum's axis of rotation. The grooves 6 are separated from each other by ridges 7. The drum 4 is rotated by a motor which is not shown in the drawings and which drives a pulley 8 by means of a belt transmission 9. The pulley 8 rotates gears situated in a gear box 20 which drive a toothed wheel 11. The teeth of the wheel 11 engage the teeth of a wheel 12 which is keyed to the shaft 5. The toothed wheel 12 is firmly connected with a pulley 13 connected by means of a belt 14 with another pulley 15. The pulley 15 drives another pulley 16 and thus moves a conveyor 17 which consists of an endless belt passing over the pulley 16.

The shaft 5 rests on bearings 18 carried by supports 19. The gear box 20 is situated close to said shaft and is used for changing the speed of the various rotating parts. Each one of the two supports 19 is provided with an arm 21 which holds one end of a rod 22. A number of knife holders 23 are carried by the rod 22. Each one of the holders 23, shown in Figure 3, comprises two projecting end members 24 and 25 which surround the rod 22 and are firmly clamped thereon by means of a screw 26 which passes through the member 24 and is screwed into the member 25. The holder 23 carries a knife 27 firmly connected with the holder by means of a screw 28.

One end of each of the knives 27 is fitted into its own separate groove 29 which intersects the grooves 6 and forms a right angle with each one of them, as shown in Figure 2.

The modification shown in the drawings comprises three grooves 29 and three knives 27 projecting into said grooves, one of which is situated in the middle of the drum 4, while the two other grooves are placed symmetrically close to the ends thereof. Obviously, this arrangement may be changed to suit various requirements.

The rod 22 also carries a number of holders 30, shown in Figures 1 and 2. Each holder 30 is clamped onto the rod 22 by means of a screw 31 and carries a spring 32 which is adapted to come in contact with the cigars situated in the grooves 4 and to hold them within said grooves while the drum 4 is being rotated.

A guide 33, shown in Figure 1, is attached to the machine plate 34 and is adapted to receive the cigars after they have been treated by the machine and to convey them to a suitable container which is not shown in the drawings.

Another guide 35 (Figure 1) is carried by a bracket 36 which also carries the shaft 37 of the rollers 15 and 16. The member 35 is used for the guiding of the cigars into the grooves 6 of the drum 4 after said cigars have left the conveyor 17.

The machine operates as follows:

Cigars or similar articles which have the shape of the grooves 6 are placed parallel to said grooves on the endless belt or conveyor 17 and are carried along by said conveyor in the direction shown by an arrow until the conveyor reaches the pulley 16. Then the cigars drop off the conveyor onto the guide 35 and slide down on this guide until they reach the drum 4. Due to the provision of grooves 6 on the external surface of the drum 4, each cigar will be held within a groove 6 between two ridges 7 while the drum is being rotated in the direction shown by an arrow. During this rotation the cigars will come in contact with the spring 32, and will be held by said spring while they are being cut by the knives 27. The middle knife 27 will cut each cigar in half while the two end knives 27 will trim the ends of the cigar. The cut cigars will leave the grooves 6 and will drop onto the guide or plate 33, sliding down this plate until they reach a suitable container.

It is to be understood that the construction of the holders 6 and 7, as well as the knives 27, may be varied and that the machine may be driven by other arrangements than those shown.

What is claimed is:—

1. A cigar cutting device, comprising a rotary drum having grooves adapted to hold the articles to be cut and another groove intersecting the first-mentioned grooves, a conveyor for bringing said articles to said drum, means for guiding the articles carried by said conveyor into the first-mentioned grooves, means for supporting said drum, a knife in the second-mentioned groove, a spring adapted to come in contact with the articles carried by said drum, and means for holding said knife and said spring, the last-mentioned means being connected with the second-mentioned means.

2. A cigar cutting device, comprising a movable member, means for carrying on said member articles to be cut, and means for cutting said articles and for trimming the ends thereof, the last-mentioned means projecting into the path of said articles.

3. A cigar cutting device, comprising a rotary drum having grooves adapted to hold the articles to be cut, three other grooves intersecting at right angles the first-mentioned grooves, one of the second-mentioned grooves being provided in the middle of said drum and two other grooves being placed close to the ends of said drum, and a knife in each of the second-mentioned grooves.

SABATO MARINO.
ALEXANDER CHALMERS.